United States Patent Office 3,606,564
Patented Sept. 20, 1971

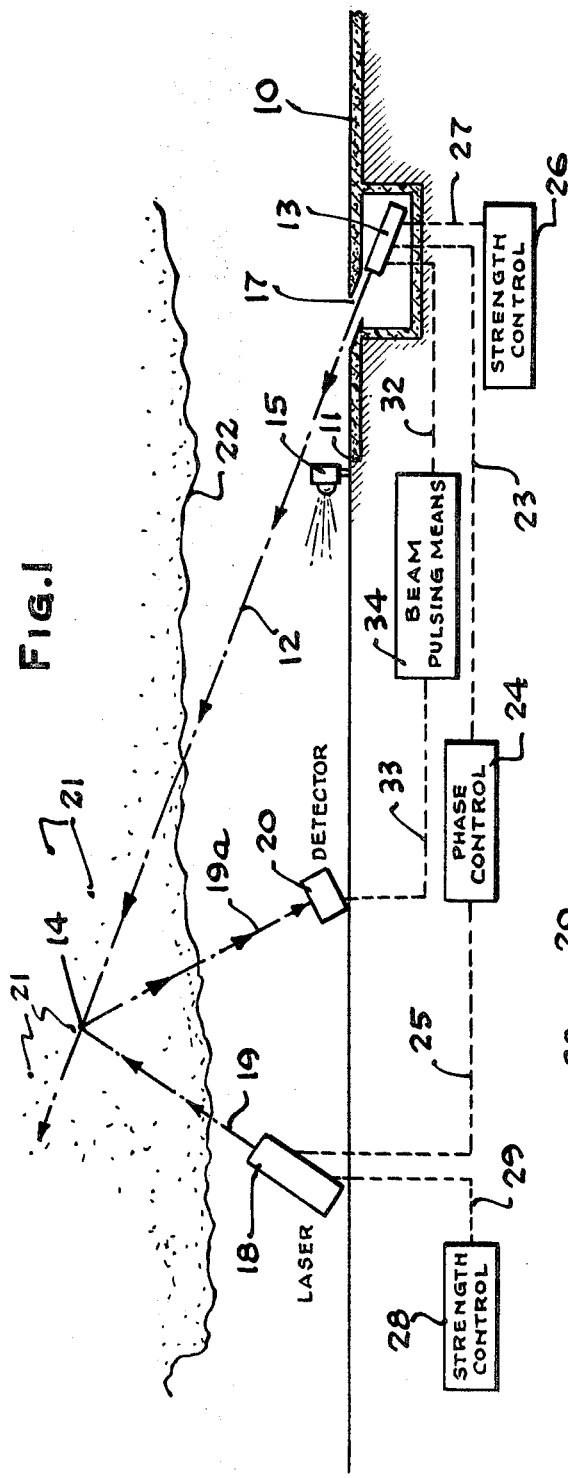
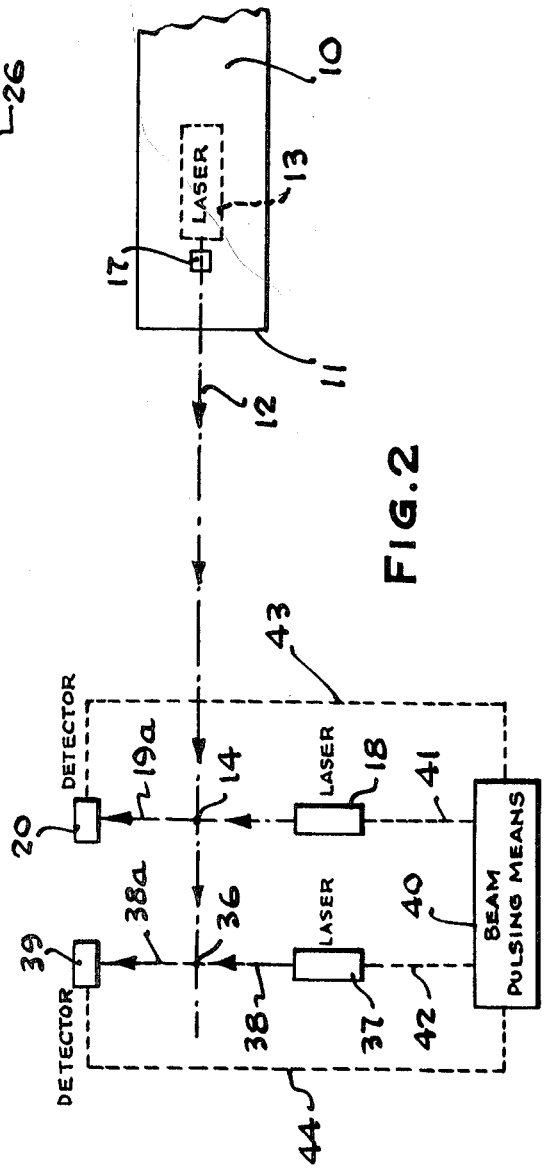

3,606,564
METHOD AND APPARATUS FOR VISIBILITY DETERMINATION AT AIRPORTS
Dennis J. Lisack, Chicago, Ill.
(Box 286 APO, San Francisco, Calif. 96328)
Filed June 5, 1969, Ser. No. 830,658
Int. Cl. G01n 21/00; G01b 9/02
U.S. Cl. 356—103                                          12 Claims

ABSTRACT OF THE DISCLOSURE

A beam of coherent light of a given frequency is directed up along the glide path at the approach end of an airport runway. At a first location below the level of said glide path and some distance from said approach end, a second beam of coherent light of said frequency is directed at a point on the glide path so that the second beam will be reflected to a second location by particles in clouds at said point. The beams are so arranged that destructive interference between the two beams at said point occurs when the visibility along said glide path is at least equal to the prescribed minimum.

BACKGROUND OF THE INVENTION

Determining whether or not an aircraft can safely approach the runway under poor visibility conditions, is a difficult problem. Observers can look across an airport and determine what is the extent of visibility in a particular diertcion, but this may have a quite inaccurate relationship to the visiblity along the glide path that the aircraft must use. Even the visibility in one direction from an airport control tower may be quite different from the visibility in another direction. At best it is only an approximation and the extent of error may create a serious hazard when the visibility conditions are at, or close to, the minimum set for an aicraft safely approaching a runway. It obviously is impractical either (1) to locate an observer some place up on the glide path to determine whether or not an observer at that point can see the end of the runway, or (2) to locate an object, such as a light, at a point up on the glide path to determine whether or not an observer at the end of the runway can see the light.

Serious airplane accidents resulting from an aircraft attempting to approach a runway under poor visibility conditions are not infrequent. These can be caused by the fact that the visibility along the line of approach is much worse than that detected by observers at the airport proper.

The principal object of the present invention is to provide a method and apparatus for determining the extent of visibility through obstructing clouds along the glide path between the approach end of the runway and the point along that glide path which point is spaced some distance, e.g., a half a mile, a mile, etc., from the approach end of the runway. This is achieved without any obstruction to the movement of the aircraft being present in or near said glide path.

SUMMARY OF THE INVENTION

The present invention relates to a method and apparatus for determining whether the visibility along the glide path leading to the approach end of an airport runway is above the prescribed minimum.

DESCRIPTION OF THE DRAWINGS

FIG. 1 is a diagrammatic elevational view of the approach end of an airport runway and illustrating the employment of the present invention in determining the visibility along the approach glide path; and FIG. 2 is a diagrammatic plan view of the approach end of an airport runway and illustrates alternative applications of the present invention.

DESCRIPTION OF SPECIFIC EMBODIMENTS

In the method of the present invention the beam of coherent light of a given frequency is directed from the ground at the approach end of a runway up along the glide path leading to that approach end. This beam of light is preferably from a laser. At some distance, e.g., a mile, from the approach end of a runway and at a location on the ground generally below the glide path, a second beam of coherent light of a given frequency is directed at a point on the glide path above that location. The direction of a second beam is such that with water or other particles present in a cloud at said point on a glide path, the second beam will be reflected back to the ground at a second location adjacent the first location. The phase of the two beams is such that they are approximately 180° out of phase at said point on the glide path. Thus, to the extent that the two beams arrive at said point, there will be destructive interference between them.

The first beam which travels along the glide path is of a known strength in relation to the minimum visibility conditions along the glide path between said point and the approach end of the runway. For example, if a person at said point should see the runway lights at the approach end of the runway, he would also see the first beam at about the same intensity. If the second beam arrives at that second location, it is known that first beam is not getting to said point on the glide path to an extent sufficient to interfere with the first beam. On the other hand, when the second beam's intensity at said second location drops to a significant extent, it is determined that destructive interference is occurring at said second point and that thereby the first beam is getting through, indicating adequate visibility.

It is possible that some other cause, such as, for example, the lack of particles at said point to create reflection to the second location, may result in failure to detect the second beam at the detecting location. To determine whether there is such a cause for the failure to detect the second beam or whether the failure of detection is due to destructive interference, the first beam extending along the glide path is pulsed, i.e., it is on for an interval and off for an interval. If during the intervals when the first beam is off, the second beam is detected at the detecting location, but is not detected there during the intervals when the first beam is on, the reason for the non-detection will be destructive interference.

The drawings illustrate a portion of an airport runway 10 having an approach end 11. The dot-dash line 12 represents an optimum glide path for aircraft approaching end 11 of the runway as well as representing the path of a beam from laser 13. The question to be determined is whether or not a pilot in an aircraft at point 14 on the glide path can see the end of the runway or, for example, see the light 15 at the approach end of the runway. Point 14, for example, might be one-half mile from the end 11 of the runway.

The laser 13 can, for example, be positioned below the runway itself with the beam 12 exiting through a small opening 17 in the runway surface. As an alternative, the laser 13 could be immediately adjacent the end of the runway in a position so that its beam did not fall exactly on the center line of the optimum approach path but approximated it for all practical purposes.

In a location generally below the point 14 on the path and beam 12 is a second laser 18 which produces a beam 19 directed angularly at point 14. Adjacent the location of laser 18 is a laser beam detector 20. The arrangement of laser 18 and detector 20 is such that the particles of water, smoke, etc., 21 which go to make up the overcast 22, will, at point 14, reflect the beam 19 back along a path 19a leading to detector 20.

Lasers 13 and 18 produce coherent beams of visible light of a common frequency. Laser 13 is connected, as indicated at 23, to a phase control device 24, as is laser 18, as indicated by connection 25. The phase of one or both lasers 13 and 18 is adjusted so that the beams 12 and 19 arrive at point 14 approximately 180° out of phase. This will result in destructive interference between the two beams at point 14. In some installations the beams 12 and 19 will be oriented, either by positioning or by polarizing means on the respective lasers, so that the lines of vibration or oscillation of the beams are parallel. Laser 13 has a beam strength control 26 connected thereto as indicated by line 27, a beam strength control 28 is connected to laser 18 as indicated by line 29.

While the beam strength adjustments may be made in various ways, one procedure will be to set the strength of beam 12 such that the amount of light emitted corresponds to the light emitted by runway light 15. Thus, if beam 12 penetrates overcast 22 sufficiently for a person at point 14 to see the laser beam, that person will also be able to see runway light 15 under minimum visibility conditions. The strength of beam 19 would be adjusted so as to give an equal amount of light at point 14 as that reaching the same point through the medium of beam 12. This would give substantially complete cancellation of the two beams at point 14. The result would be that beam 19a would be non-existent, or relatively weak, under all overcast down to the minimum. If the visibility drops below the minimum, an insignificant amount of light from beam 12 reaches point 14 so that there is little if any destructive interference at that point. Thus, reflected beam 19a would exist which is determined by detector 20.

It is not necessary that the strength of beams 19 and 12 at point 14 be exactly equal. The detector 20 will determine whether or not there is a substantial change in the reflected beam 19a as a result of beam 12 reaching point 14. In this respect it should be noted that the locations of laser 18 and detector 20 are substantially closer to point 14 than is the location of laser 13. Thus the existence of overcast conditions will have a greater effect on the obscuring of beam 12 than it will have on the obscuring of beam 19. Beams 19 and 19a can lie in a plane which also includes line 12 or, as illustrated in FIG. 2, the plane of beams 19 and 19a can extend across beam 12.

It is possible that something other than the presence of light from beam 12 reaching point 14 would cause reflected beam 19a not to exist or to be extremely weak. Thus, for example, point 14 could lie in an area in which there was no overcast at all, in which case there would be no particles 21 to create a reflection of beam 19 to exist as reflected beam 19a. As a check on the possibility of some such occurrence, laser 13 and detector 20 are connected, as indicated by lines 32 and 33, to a beam pulsing means 34. Pulsing means 34 would cause beam 12 to exist for one interval and to be non-existent for a second interval, e.g., the beam would be on for one second and off for the subsequent second, in rapid repetition. If during the period when beam 12 was non-existent, detector 20 determined that reflected beam 19a existed, and detector 20 determined that reflected beam 19a did not exist (or was substantially weaker) during the times that beam 12 existed, then it would be known that destructive interference was occurring at point 14. If during both intervals, detector 20 ascertained that beam 19a existed at about the same strength, this would be a warning that an airplane should not attempt to approach runway 10.

FIG. 2 illustrates one way of using the present invention to determine the visibility conditions at several points along the flight path 12. For example, if point 14 were half a mile from the end 11 of the runway, point 36 (on beam and flight path 12) could be three quarters of a mile from the end of the runway. The laser 37 has its beam 38 directed at point 36 at an angle such that its reflected beam 38a will be received by a detector 39. The arrangement of 37–39 otherwise corresponds to the arrangement of 18–20 as previously described. If the beam 12 is getting through to point 14 and causing destructive interference, as determined as previously described, laser 18 is turned off and laser 37 operated to determine whether or not destructive interference occurs at point 36. This turning on and off of the beams can be achieved by a beam pulsing means 40 connected to lasers 18 and 37, as indicated by lines 41 and 42. Preferably the pulsing means 40 also would be connected to detectors 20 and 39, as indicated by lines 43 and 44, so that their respective detector would be informed as to the times it was supposed to determine whether or not it should check for the existence or non-existence of a reflected beam. An alternative to the use of two lasers 18 and 37 (as illustrated in FIG. 2) would be to use but a single laser which would be moved from point to point in connection with its detector or would be pivoted so as to strike the glide path 12 at a different point to be reflected to a third location, e.g., the location of detector 39.

I claim:

1. The method of measuring the slant visibility through a distance from a first point to a second point with a part of said distance, including said second point, being in clouds having water particles or the like, said method comprising the steps of:
projecting a first beam of coherent visible light of a given frequency from said first point toward said second point, said light being of such a strength that upon arrival at said second point with a given intensity a person at said second point can see said first point;
projecting a second beam of coherent visible light of said given frequency from one location toward said second point at an angle such that said second beam will be reflected by said particles to a second location;
adjusting the phase of said beams such that at said second point said beams are out of phase to a substantial extent whereby destructive interference will occur between said beams to the extent that they arrive at said second point; and
at said second location, measuring the amount of said second beam there arriving to thereby obtain an indication of the extent of said destructive interference occurring at said other point as an indication of the intensity of the first beam at said second point.

2. The method as set forth in claim 1, wherein said step of adjusting the phase comprises adjusting the phase so that at said second point the first and second beams are about 180° out of phase.

3. The method as set forth in claim 2 for use at an airport having a light at about the approach end of the runway, which light has a known intensity, to which airport a plane will approach the approach end approximately along a known glide path, including the steps of:
projecting said first beam, from the approach end, substantially along said glide path; and
adjusting the intensity of said first beam at said approach end approximately equal to said known intensity of said light at said approach end of the runway.

4. The method as set forth in claim 3, further comprising the step of adjusting the intensity of said second beam so that its intensity at said second point is approximately said given intensity.

5. The method as set forth in claim 4, including the step of polarizing said first and second beams such that at said second point the respective planes of polarization of the first and second beams are substantially parallel.

6. The method as set forth in claim 1, including the step of polarizing said first and second beams such that at said second point the respective panes of polarization of the first and second beams are substantially parallel.

7. The method as set forth in claim 1, further comprising the step of pulsing said first beam between said strength for a first interval and a substantially lesser strength for a second interval whereby if said second beam is detected during said second interval and not during said first interval it will be known that said destructive interference is occurring while if said second beam is not detected during either interval it will be known that it is not being reflected to said second location.

8. An apparatus for measuring the visibility along the glide path at the approach end of an airport runway to a point on said path spaced from said end, under conditions such that a part of said path including said point are in clouds having water particles or the like, said apparatus being for the purpose of determining whether said cloud obscures visibility along said glide path to below a prescribed minimum and comprising:

first means for producing a first beam of coherent light of a given frequency and a given phase, said means being positioned at said approach end with said beam being directed upwardly toward said point, said first beam having a strength such that it will arrive at said point with a given intensity when the visibility is at said prescribed minimum;

second means for producing a second beam of coherent light of said given frequency, said second means being positioned at a first location significantly closer to said point than is said approach end and with said beam directed at said point so that particles at said point will reflect the second beam from said point to a second location, the second means producing a beam of such a phase and intensity in relation to the given phase of the first beam that at said point said beams are substantially out of phase whereby destructive interference between the beams will occur when said first beam arrives at said point with said given intensity;

a detector device positioned at said second location for detecting light scattered by particles present at said point and producing an output signal; and indicator means coupled to said detector device for determining from the output of said detector device whether or not the second beam is being reflected to said second location when particles are present at said point to thereby ascertain whether or not destructive interference at said point is occurring.

9. An apparatus as set forth in claim 8, including a phase control means connected to at least one of said first and second means for producing respective first and second beams for setting the phase of said beams such that they arrive at said point substantially 180° out of phase.

10. An apparatus as set forth in claim 9, including a polarizing means for polarizing said first and second beams such that the plane of polarization of said first beam at said point substantially corresponds to the plane of polarization of said second beam at said point.

11. An apparatus as set forth in claim 10 including pulsing means connected to said first means for producing a first beam and to said detector device for pulsing said first beam in intensity for a first time interval at said strength and for a second time interval at a substantially lesser intensity and to provide a reference signal for said detector device and said indicator means for indicating when said second beam is reflected to said detector device during said first interval and during said second interval whereby it is determined if the failure of the detector device to receive said second beam is due to destructive interference or otherwise.

12. An apparatus as set forth in claim 8 including pulsing means connected to said first means for producing a first beam and to said detector device for pulsing said first beam in intensity for a first interval at said strength and for a second interval at a substantially lesser intensity and to provide a reference signal for said detector device and said indicator means for indicating when said second beam is reflected to said detector device during said first interval and during said second interval whereby it is determined if the failure of the detector device to receive said second beam is due to destructive interference or otherwise.

References Cited

UNITED STATES PATENTS

| 3,146,293 | 8/1964 | Lesage. |
|---|---|---|
| 3,299,769 | 1/1967 | Byers. |
| 3,446,558 | 5/1969 | Seaton. |
| 3,499,159 | 3/1970 | Carrier et al. |

FOREIGN PATENTS

| 1,374,654 | 8/1964 | France. |
|---|---|---|
| 794,472 | 5/1958 | Great Britain. |

OTHER REFERENCES

Stevens et al., Motorola, Inc., Riverside Research Labs, "The Determination of Atmospheric Transmissivity . . .," July 1957.

RONALD L. WIBERT, Primary Examiner

W. A. SKLAR, Assistant Examiner

U.S. Cl. X.R.

356—104, 106; 250—218